United States Patent
Hummel et al.

[15] 3,695,093
[45] Oct. 3, 1972

[54] DEVICE FOR MEASURING THE SOLIDIFICATION TEMPERATURE OF LIQUIDS

[72] Inventors: Heinz Hummel; Herbert Gortz, both of Frankfurt/Main, Germany

[73] Assignee: Farbwerke Hoechst Aktiengesellschaft vormals Meister Lucius and Bruning, Frankfurt/Main, Germany

[22] Filed: Nov. 20, 1970

[21] Appl. No.: 91,451

[30] Foreign Application Priority Data

Nov. 21, 1969 Germany..........P 19 58 476.0

[52] U.S. Cl. .................................................73/17 R
[51] Int. Cl. ...............................................G01n 25/04
[58] Field of Search.............................................73/17

[56] References Cited

UNITED STATES PATENTS

| | | | |
|---|---|---|---|
| 3,457,771 | 7/1969 | Davis | 73/17 |
| 2,635,455 | 4/1953 | Staehling | 73/17 |
| 3,060,318 | 10/1962 | Ouvrard | 73/17 X |

*Primary Examiner*—James J. Gill
*Assistant Examiner*—Herbert Goldstein
*Attorney*—Connolly and Hutz

[57] ABSTRACT

To measure the solidification temperature of liquids a device is used comprising a heatable and coolable receptacle for a sample of the liquid, a temperature sensitive element and in the receptacle in the vicinity of the temperature sensitive element means to produce a local supercooling.

6 Claims, 1 Drawing Figure

PATENTED OCT 3 1972
3,695,093
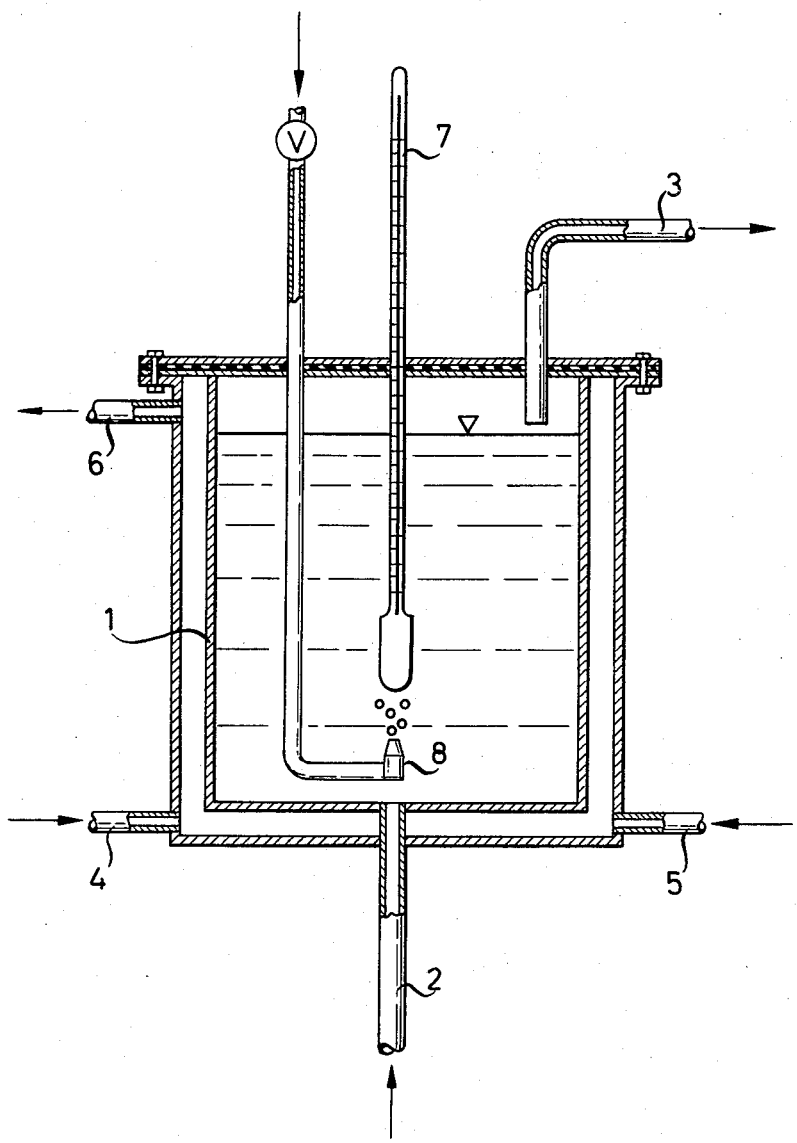
INVENTORS
HEINZ HUMMEL
HERBERT GÖRTZ
BY Connolly and Hutz
their ATTORNEYS

DEVICE FOR MEASURING THE SOLIDIFICATION TEMPERATURE OF LIQUIDS

The present invention relates to a device for measuring the solidification temperature of liquids.

Devices for determining the solidification temperature have been proposed, comprising a heatable and coolable receptacle for the sample and in the interior thereof a thermometer and optionally a stirring device. The known devices have the drawback that the measuring result is falsified always by supercooling of the sample at a temperature below the solidification temperature. By additional manual rubbing of the thermometer on the wall of the receptacle and adding seed crystals the measuring error may be somewhat diminished depending on the skill of the measurer.

It has now been found that the aforesaid drawbacks can be avoided when, for measuring the solidification temperature of liquids, a device is used comprising a receptacle for a sample of the liquid, means for heating and cooling, and a temperature sensitive element, in which device in the receptacle for the sample near the temperature sensitive element means are provided for to produce a local supercooling. The means to produce a local supercooling are suitably arranged between the bottom of the receptacle and the temperature sensitive element. As means to produce a local supercooling there may be used at least one gas outlet or a thermoelectric cooling element.

It is expedient to dimension the gas outlet in a manner such that the gas bubbles are as small as possible, preferably have a diameter of from 0.1 to 0.8 millimeter and get into the sample in the direct vicinity of the temperature sensitive element so that a strong local supercooling can be produced.

The device according to the invention is suitable for the construction of automatic instruments to determine the solidification temperature in production control. It can also be used, however, to carry out reliable and rapid routine analyses in laboratories.

The device according to the invention is now illustrated with reference to the accompanying drawing. The receptacle for the sample 1 suitably has a double wall and is provided with an inlet and outlet 2 and 3 for the sample, an inlet each for the cooling and heating medium 4 and 5, and an outlet 6 therefor. It is also possible, of course, to use, instead of the double-walled receptacle, receptacles with known heat exchange means, such as cooling coils and the like. In the interior of the receptacle for the sample a temperature sensitive element 7 is arranged and between the said temperature sensitive element 7 and the bottom of the receptacle at least one gas outlet 8 or a thermoelectric cooling element is fixed, preferably on the extended axis of the temperature sensitive element. In the drawing there is shown manually operable value but not the valves required for automatic operation in the inlets and outlets for the sample, the heating and cooling medium and the supply pipe for the gas outlet 8, nor the control mechanisms for the valves, and the electronic control and regulating elements for the measuring and control mechanisms.

After introducing the sample into the device of the invention, inlet 2 into receptacle 1 is closed and the receptacle is heated, for example by means of steam supplied through inlet 5. In general, it is sufficient to heat the sample 10° to 20° C above the respective solidification temperature. When the desired value is reached, the supply of steam is discontinued, which, in the case of an automatic operation, may be done by a thermocouple. After switching off the heating, the sample is cooled, for example by introducing cooling air into the heat exchange jacket of the receptacle, and simultaneously gas is introduced in the form of small bubbles into the sample in the direct vicinity of the temperature sensitive element 7. The introduction of air may likewise be controlled automatically. When approaching the solidification temperature, i.e., when the cooling rate of the sample diminishes owing to a beginning crystallization, the current of gas bubbles is interrupted, in the case of an automatic operation by means of a suitable control mechanism, for example a differential amplifier which is actuated when the cooling rate falls below a given value. From that time on the temperature of the sample approaches a constant value corresponding to the solidification temperature.

The above process can be practiced as often as desired with and without change of the sample. In connection with appropriate recording devices and control mechanisms, the device of the invention can be operated discontinuously and automatically.

What is claimed is:

1. A device for measuring the solidification temperature of a liquid comprising a receptacle for a sample of the liquid, heating and cooling means operatively associated with the receptacle for heating the liquid sample above its solidification temperature and cooling the liquid below the solidification temperature, a temperature sensitive element disposed within the receptacle for determining the temperature of the liquid sample particularly upon its solidification and for providing an indication of said temperature, a concentrated supercooling means disposed in said receptacle in the immediate vicinity of the temperature sensitive element for producing a concentrated local supercooling in the liquid sample in the immediate vicinity of the temperature sensitive element, and said temperature sensitive element providing means for determining when the rate of cooling of the liquid sample in the receptacle diminishes below a predetermined rate whereby the temperature of the liquid sample in the receptacle approaches a substantially constant value corresponding to its solidification temperature and the temperature sensitive element is thereby caused to indicate the solidification temperature of the liquid sample.

2. The device of claim 1, wherein the means to produce a local supercooling in the receptacle for the sample are arranged between the bottom of the receptacle and the temperature sensitive element.

3. The device of claim 1, wherein the means to produce a local supercooling consist of at least one gas outlet.

4. The device of claim 1, wherein the means to produce a local supercooling consist of a thermoelectric cooling element.

5. A device as set forth in claim 1 wherein a recording device is connected to the temperature sensitive element for providing a record of the temperature of the liquid sample as it approaches and arrives at its solidification temperature.

6. A device as set forth in claim 1 wherein said concentrated supercooling means includes means for terminating its operation.

* * * * *